United States Patent
Syouda

(10) Patent No.: US 10,756,548 B2
(45) Date of Patent: Aug. 25, 2020

(54) QUICK CHARGING DEVICE WITH SWITCHING UNIT FOR INDIVIDUAL BATTERY MODULE DISCHARGING

(71) Applicant: Yazaki Corporation, Tokyo (JP)

(72) Inventor: Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/679,375

(22) Filed: Aug. 17, 2017

(65) Prior Publication Data

US 2018/0062402 A1   Mar. 1, 2018

(30) Foreign Application Priority Data

Aug. 25, 2016   (JP) .................................. 2016-164950

(51) Int. Cl.
*H02J 7/00* (2006.01)
*H02P 27/06* (2006.01)

(52) U.S. Cl.
CPC .......... *H02J 7/0016* (2013.01); *H02J 7/0014* (2013.01); *H02J 7/0019* (2013.01); *H02J 7/0024* (2013.01); *H02P 27/06* (2013.01); *Y02T 10/7055* (2013.01)

(58) Field of Classification Search
CPC ............................... H02J 7/0016; H02J 7/0019
USPC ....................................................... 320/118
See application file for complete search history.

(56) References Cited

U.S. PATENT DOCUMENTS

| | | | | |
|---|---|---|---|---|
| 3,886,426 A | * | 5/1975 | Daggett | B60L 11/1855 318/139 |
| 4,274,043 A | * | 6/1981 | Heitz | H01M 10/4207 307/151 |
| 4,313,080 A | * | 1/1982 | Park | B60L 11/14 180/65.225 |
| 4,371,825 A | * | 2/1983 | Chi | H01M 10/441 307/327 |
| 4,616,170 A | * | 10/1986 | Urstoger | H01M 10/44 320/119 |
| 5,438,250 A | * | 8/1995 | Retzlaff | H02J 7/0019 320/128 |
| 5,523,667 A | * | 6/1996 | Feldstein | H02J 7/0018 320/100 |
| 5,543,245 A | * | 8/1996 | Andrieu | G01R 31/379 429/90 |
| 5,578,914 A | * | 11/1996 | Morita | H01M 10/44 320/122 |

(Continued)

FOREIGN PATENT DOCUMENTS

| | | | |
|---|---|---|---|
| JP | 05074492 A | * | 3/1993 |
| JP | 2007300701 A | * | 11/2007 |
| JP | 2014-193033 A | | 10/2014 |

*Primary Examiner* — John T Trischler
(74) *Attorney, Agent, or Firm* — Kenealy Vaidya LLP

(57) ABSTRACT

A quick charging device connects, in a charging operation, a plurality of battery modules in series, and connects the battery modules that are connected in series to a charger, and selects, in a discharging operation, one of the battery modules, and connects the selected battery module to a load unit. When the amount of charge in the battery module connected to the load unit drops by a predetermined amount during the discharging operation, the quick charging device connects another battery module having the largest amount of charge to the load unit.

9 Claims, 4 Drawing Sheets

(56) References Cited

U.S. PATENT DOCUMENTS

| | | | | |
|---|---|---|---|---|
| 5,703,464 A * | 12/1997 | Karunasiri | ............ | B60L 3/0046 |
| | | | | 180/65.8 |
| 5,814,970 A * | 9/1998 | Schmidt | .............. | H01M 10/441 |
| | | | | 320/118 |
| 5,874,823 A * | 2/1999 | Suzuki | .................. | H02J 7/0014 |
| | | | | 320/125 |
| 5,886,503 A * | 3/1999 | McAndrews | ......... | H02J 7/0022 |
| | | | | 320/121 |
| 5,998,969 A * | 12/1999 | Tsuji | ..................... | H02J 7/0016 |
| | | | | 320/130 |
| 6,177,779 B1 * | 1/2001 | Eguchi | ..................... | G06F 1/263 |
| | | | | 320/116 |
| 6,239,579 B1 * | 5/2001 | Dunn | .................... | H02J 7/0019 |
| | | | | 320/121 |
| 6,297,618 B2 * | 10/2001 | Emori | ............ | G01R 19/16542 |
| | | | | 320/132 |
| 6,459,175 B1 * | 10/2002 | Potega | .................. | B60L 11/185 |
| | | | | 307/132 M |
| 6,741,065 B1 * | 5/2004 | Ishii | ..................... | H02J 7/0024 |
| | | | | 320/122 |
| 7,059,769 B1 * | 6/2006 | Potega | ................ | B60L 11/1861 |
| | | | | 338/22 R |
| 7,085,123 B2 * | 8/2006 | Shiue | ........................ | H02P 7/04 |
| | | | | 320/165 |
| 7,378,818 B2 * | 5/2008 | Fowler | ................ | H01M 10/441 |
| | | | | 320/119 |
| 7,495,415 B2 * | 2/2009 | Kanouda | ................... | G06F 1/30 |
| | | | | 307/66 |
| 7,612,530 B2 * | 11/2009 | Konishi | ................ | H02J 7/0016 |
| | | | | 320/118 |
| 7,626,359 B2 * | 12/2009 | Imai | ...................... | H02J 7/0026 |
| | | | | 320/116 |
| 7,696,729 B2 * | 4/2010 | Shiue | ....................... | B60K 6/28 |
| | | | | 320/166 |
| 7,755,326 B1 * | 7/2010 | Thivierge | .............. | B60L 3/0046 |
| | | | | 320/116 |
| 7,872,443 B2 * | 1/2011 | Ward | ........................ | H02J 7/35 |
| | | | | 320/103 |
| 7,888,910 B2 * | 2/2011 | Zeng | ..................... | H02J 7/0016 |
| | | | | 307/66 |
| 7,893,562 B2 * | 2/2011 | Oga | .................... | H01M 10/482 |
| | | | | 307/71 |
| 7,911,179 B2 * | 3/2011 | Nakanishi | ............. | H02J 7/0016 |
| | | | | 307/66 |
| 7,982,429 B1 * | 7/2011 | Oh | ......................... | H02J 7/0016 |
| | | | | 320/118 |
| 8,008,890 B2 * | 8/2011 | Lee | ....................... | H02J 7/0018 |
| | | | | 320/118 |
| 8,013,574 B2 * | 9/2011 | Naganuma | .......... | B60L 11/1861 |
| | | | | 320/118 |
| 8,044,637 B2 * | 10/2011 | Thivierge | .............. | B60L 3/0046 |
| | | | | 320/116 |
| 8,098,048 B2 * | 1/2012 | Hoff | ...................... | H02J 7/0019 |
| | | | | 320/116 |
| 8,120,322 B2 * | 2/2012 | Lee | ....................... | H02J 7/0016 |
| | | | | 320/118 |
| 8,134,337 B2 * | 3/2012 | Morita | .................. | H02J 7/0016 |
| | | | | 320/118 |
| 8,159,191 B2 * | 4/2012 | Chang | .................... | B60K 16/00 |
| | | | | 320/136 |
| 8,217,623 B2 * | 7/2012 | Oh | ........................ | H02J 7/0016 |
| | | | | 320/118 |
| 8,222,865 B2 * | 7/2012 | Lim | .................... | H01M 10/441 |
| | | | | 320/124 |
| 8,253,378 B2 * | 8/2012 | Lee | ........................ | H02J 7/0016 |
| | | | | 320/116 |
| 8,314,592 B2 * | 11/2012 | Rudorff | ................. | H02J 7/0016 |
| | | | | 320/116 |
| 8,330,418 B2 * | 12/2012 | Furukawa | ............. | H02J 7/0018 |
| | | | | 320/118 |
| 8,358,032 B2 * | 1/2013 | Oga | .................... | H01M 10/482 |
| | | | | 307/71 |
| 8,432,132 B2 * | 4/2013 | Nakanishi | ............. | H02J 7/0016 |
| | | | | 320/116 |
| 8,476,869 B2 * | 7/2013 | Shiu | ....................... | H02J 7/0016 |
| | | | | 307/66 |
| 8,648,568 B2 * | 2/2014 | McCollum | ................ | G06F 1/26 |
| | | | | 307/48 |
| 8,710,801 B2 * | 4/2014 | Schwartz | ............. | H02J 7/0016 |
| | | | | 320/119 |
| 8,779,722 B2 * | 7/2014 | Lee | ....................... | H02J 7/0016 |
| | | | | 320/116 |
| 8,786,256 B2 * | 7/2014 | Emori | .................. | B60L 3/0046 |
| | | | | 320/118 |
| 8,836,285 B2 * | 9/2014 | Yamada | .................... | H02J 3/32 |
| | | | | 307/48 |
| 8,838,312 B2 * | 9/2014 | Sadler | ................. | H02J 7/0024 |
| | | | | 701/22 |
| 8,884,580 B2 * | 11/2014 | Roeper | ................. | H02J 7/0019 |
| | | | | 320/103 |
| 8,896,155 B2 * | 11/2014 | Oga | .................... | H01M 10/482 |
| | | | | 307/71 |
| 8,912,756 B2 * | 12/2014 | Emori | .................. | B60L 3/0046 |
| | | | | 320/116 |
| 8,947,023 B2 * | 2/2015 | Kawahara | ........... | H01M 10/486 |
| | | | | 318/139 |
| 9,024,586 B2 * | 5/2015 | Vance | .................. | B60L 3/0046 |
| | | | | 320/122 |
| 9,035,611 B2 * | 5/2015 | Kikuchi | ............... | B60L 3/0046 |
| | | | | 320/116 |
| 9,045,047 B2 * | 6/2015 | Ito | ....................... | B60L 11/1816 |
| 9,048,668 B2 * | 6/2015 | Kabasawa | ............ | H02J 7/0018 |
| 9,048,669 B2 * | 6/2015 | Lim | ...................... | H02J 7/0019 |
| 9,136,716 B2 * | 9/2015 | White | ..................... | H01M 2/30 |
| 9,136,726 B2 * | 9/2015 | Shinozaki | ............. | H01M 10/48 |
| 9,166,419 B2 * | 10/2015 | Girard | ................. | H01M 10/441 |
| 9,172,260 B2 * | 10/2015 | Sahu | ...................... | H02J 7/0016 |
| 9,203,247 B2 * | 12/2015 | Nakashima | ........... | H02J 7/0019 |
| 9,252,602 B2 * | 2/2016 | Ohkawa | ................ | H02J 7/0016 |
| 9,318,779 B2 * | 4/2016 | Uno | ...................... | H01M 10/44 |
| 9,331,497 B2 * | 5/2016 | Beaston | ............ | H01M 10/4207 |
| 9,331,499 B2 * | 5/2016 | Ikriannikov | .............. | H02J 1/10 |
| 9,444,118 B2 * | 9/2016 | Kim | .................... | H01M 10/0445 |
| 9,444,267 B2 * | 9/2016 | Suzuki | ................ | H01M 10/441 |
| 9,461,292 B2 * | 10/2016 | Tsutsumi | ................ | H01M 2/206 |
| 9,515,508 B2 * | 12/2016 | Xue | ....................... | H02J 7/007 |
| 9,577,442 B2 * | 2/2017 | Sakurai | ................ | H02J 7/0016 |
| 9,647,466 B2 * | 5/2017 | Kubo | ...................... | B60L 11/18 |
| 9,705,341 B2 * | 7/2017 | Komatsu | ............... | H02J 7/0014 |
| 9,735,590 B2 * | 8/2017 | Wang | .................... | H02J 7/0016 |
| 9,875,860 B2 * | 1/2018 | Malapelle | ............... | H02M 1/32 |
| 10,008,862 B2 * | 6/2018 | Takizawa | ............ | H01M 10/441 |
| 10,020,662 B2 * | 7/2018 | Komatsu | ............... | H02J 7/0014 |
| 10,042,005 B2 * | 8/2018 | Syouda | ................ | G01R 31/3662 |
| 10,063,069 B1 * | 8/2018 | Huff | ....................... | H02J 7/0019 |
| 10,110,016 B2 * | 10/2018 | Casimir | ................ | H02J 7/1415 |
| 10,110,023 B2 * | 10/2018 | Magagnin | ............. | H02J 7/0024 |
| 10,122,187 B2 * | 11/2018 | Hwang | ................. | H02J 7/0021 |
| 2001/0011881 A1 * | 8/2001 | Emori | ............. | G01R 19/16542 |
| | | | | 320/116 |
| 2003/0071466 A1 | 4/2003 | Gale et al. | | |
| 2003/0085621 A1 * | 5/2003 | Potega | .................. | B60L 11/185 |
| | | | | 307/18 |
| 2004/0217737 A1 * | 11/2004 | Popescu | ............ | H01M 10/4257 |
| | | | | 320/128 |
| 2005/0156566 A1 * | 7/2005 | Thorsoe | ................ | H02J 7/0019 |
| | | | | 320/116 |
| 2007/0279004 A1 * | 12/2007 | Wang | .................... | H02J 7/0019 |
| | | | | 320/128 |
| 2008/0030167 A1 * | 2/2008 | Hsu | ....................... | H02J 7/0019 |
| | | | | 320/119 |
| 2008/0088280 A1 * | 4/2008 | Wan | ....................... | H02J 7/0031 |
| | | | | 320/136 |
| 2008/0100258 A1 * | 5/2008 | Ward | .................... | H01M 10/465 |
| | | | | 320/101 |
| 2008/0116850 A1 * | 5/2008 | Konishi | ................ | H02J 7/0016 |
| | | | | 320/118 |
| 2008/0191662 A1 * | 8/2008 | Nakanishi | ............. | H02J 7/0016 |
| | | | | 320/118 |

(56) References Cited

U.S. PATENT DOCUMENTS

| | | | |
|---|---|---|---|
| 2008/0191663 A1* | 8/2008 | Fowler | B60L 58/22 320/118 |
| 2008/0203966 A1* | 8/2008 | Ward | H02J 7/35 320/104 |
| 2009/0072625 A1* | 3/2009 | Oga | H01M 10/482 307/80 |
| 2009/0085516 A1* | 4/2009 | Emori | B60L 3/0046 320/118 |
| 2009/0091295 A1* | 4/2009 | Wan | H02J 7/0024 320/134 |
| 2009/0091332 A1* | 4/2009 | Emori | H02J 7/0018 324/537 |
| 2009/0096419 A1* | 4/2009 | White | H01M 2/30 320/118 |
| 2009/0102421 A1* | 4/2009 | Imai | H02J 7/0014 320/118 |
| 2009/0102422 A1* | 4/2009 | Naganuma | B60L 11/1861 320/118 |
| 2009/0140694 A1* | 6/2009 | Zeng | H02J 7/0016 320/118 |
| 2009/0167242 A1* | 7/2009 | Naganuma | H01M 10/441 320/118 |
| 2009/0261782 A1* | 10/2009 | Morita | H02J 7/0016 320/118 |
| 2009/0302803 A1* | 12/2009 | Oh | H02J 7/0016 320/118 |
| 2010/0001737 A1* | 1/2010 | Kubo | B60L 11/18 324/434 |
| 2010/0007308 A1* | 1/2010 | Lee | H02J 7/0018 320/118 |
| 2010/0079116 A1* | 4/2010 | Thivierge | B60L 3/0046 320/153 |
| 2010/0148726 A1* | 6/2010 | Lee | H02J 7/0016 320/118 |
| 2010/0194341 A1* | 8/2010 | Anupindi | G06F 1/263 320/118 |
| 2010/0231166 A1* | 9/2010 | Lee | H02J 7/0016 320/118 |
| 2010/0283427 A1* | 11/2010 | Sugiyama | H01M 10/441 320/118 |
| 2010/0314182 A1* | 12/2010 | Crain | B60K 1/04 180/60 |
| 2010/0314183 A1* | 12/2010 | Olsen | B60K 1/04 180/65.1 |
| 2011/0001456 A1* | 1/2011 | Wang | H02J 7/0016 320/117 |
| 2011/0025270 A1* | 2/2011 | Nakanishi | H01M 10/441 320/116 |
| 2011/0062917 A1* | 3/2011 | Shiu | H02J 7/0016 320/118 |
| 2011/0080138 A1* | 4/2011 | Nakanishi | H02J 7/0016 320/116 |
| 2011/0089898 A1* | 4/2011 | Lee | H02J 7/0016 320/116 |
| 2011/0089904 A1* | 4/2011 | Ward | B60L 8/003 320/126 |
| 2011/0109166 A1* | 5/2011 | Oga | H01M 10/482 307/80 |
| 2011/0115298 A1* | 5/2011 | Oga | H01M 10/482 307/77 |
| 2011/0115436 A1* | 5/2011 | Zhang | H01M 10/44 320/134 |
| 2011/0118916 A1* | 5/2011 | Gullichsen | B60L 11/1855 701/22 |
| 2011/0130907 A1* | 6/2011 | Gau | B60W 10/26 701/22 |
| 2011/0140665 A1* | 6/2011 | Tamezane | H02J 7/0016 320/118 |
| 2011/0156618 A1* | 6/2011 | Seo | H01M 10/425 318/3 |
| 2011/0234164 A1* | 9/2011 | Furukawa | H02J 7/0018 320/118 |
| 2012/0001483 A1* | 1/2012 | Bergefjord | B60L 53/11 307/9.1 |
| 2012/0025769 A1* | 2/2012 | Kikuchi | B60L 3/0046 320/118 |
| 2012/0056594 A1* | 3/2012 | Yanagihara | H02J 7/0014 320/134 |
| 2012/0074898 A1* | 3/2012 | Schwartz | H02J 7/0016 320/107 |
| 2012/0086390 A1* | 4/2012 | Lim | H02J 7/0019 320/107 |
| 2012/0091963 A1* | 4/2012 | Vance | H02J 7/0024 320/118 |
| 2012/0146572 A1* | 6/2012 | Ward | B60L 11/1809 320/101 |
| 2012/0161714 A1* | 6/2012 | Ishibashi | H02J 7/0063 320/135 |
| 2012/0212183 A1* | 8/2012 | Yamada | H02J 3/32 320/126 |
| 2012/0223576 A1* | 9/2012 | Tsutsumi | H01M 2/206 307/9.1 |
| 2012/0256569 A1* | 10/2012 | Kawahara | H01M 10/486 318/139 |
| 2012/0256593 A1* | 10/2012 | Milios | H01M 10/441 320/118 |
| 2012/0286722 A1* | 11/2012 | Kabasawa | H02J 7/0018 320/107 |
| 2012/0299549 A1* | 11/2012 | Kim | H01M 10/0445 320/118 |
| 2012/0306432 A1* | 12/2012 | Xu | H01M 10/63 320/103 |
| 2012/0313583 A1* | 12/2012 | Oh | H02J 7/0016 320/118 |
| 2012/0326654 A1* | 12/2012 | Ito | B60L 11/1816 320/103 |
| 2013/0002201 A1* | 1/2013 | Bodkin | H02J 7/0016 320/118 |
| 2013/0015819 A1* | 1/2013 | Nakashima | H02J 7/0019 320/126 |
| 2013/0043841 A1* | 2/2013 | Wei | H02J 7/0093 320/118 |
| 2013/0049457 A1* | 2/2013 | Komatsu | H02J 7/0014 307/9.1 |
| 2013/0069598 A1* | 3/2013 | Tanaka | H01M 10/0525 320/134 |
| 2013/0106357 A1* | 5/2013 | Girard | H01M 10/441 320/126 |
| 2013/0162214 A1* | 6/2013 | Liao | H02J 7/0019 320/121 |
| 2013/0175975 A1* | 7/2013 | Shinozaki | H01M 10/48 320/106 |
| 2013/0187612 A1* | 7/2013 | Aiura | H01M 10/425 320/118 |
| 2013/0200848 A1* | 8/2013 | Ozawa | B60L 11/1855 320/112 |
| 2013/0257323 A1* | 10/2013 | Diamond | B60L 58/16 318/376 |
| 2013/0257377 A1* | 10/2013 | Diamond | G01R 31/3835 320/118 |
| 2013/0257381 A1* | 10/2013 | Diamond | H02J 7/0021 320/134 |
| 2013/0293198 A1* | 11/2013 | Nakashima | H02J 7/0016 320/118 |
| 2013/0320914 A1* | 12/2013 | Li | H02J 7/0014 320/103 |
| 2013/0320926 A1* | 12/2013 | Kerfoot, Jr. | H01M 10/44 320/117 |
| 2014/0021923 A1* | 1/2014 | Uchida | H02J 7/007 320/118 |
| 2014/0042974 A1* | 2/2014 | Yang | H01M 10/441 320/119 |
| 2014/0091751 A1* | 4/2014 | Workman | H02J 7/0013 320/106 |
| 2014/0203782 A1* | 7/2014 | Xue | H02J 7/007 320/134 |
| 2014/0225622 A1* | 8/2014 | Kudo | B60L 3/0046 324/433 |

(56) References Cited

U.S. PATENT DOCUMENTS

| | | | |
|---|---|---|---|
| 2014/0253046 A1* | 9/2014 | Poznar | H02J 7/0063 320/136 |
| 2014/0320065 A1* | 10/2014 | Sahu | H02J 7/0019 320/107 |
| 2015/0042282 A1* | 2/2015 | Oga | H01M 10/482 320/118 |
| 2015/0042283 A1* | 2/2015 | Camp | H02J 7/0019 320/121 |
| 2015/0054343 A1* | 2/2015 | Cui | H02J 7/02 307/66 |
| 2015/0067362 A1* | 3/2015 | Sultenfuss | G06F 1/3296 713/320 |
| 2015/0088253 A1* | 3/2015 | Doll | A61F 2/1624 623/6.22 |
| 2015/0222132 A1* | 8/2015 | Shikatani | H01M 10/441 320/117 |
| 2015/0349551 A1* | 12/2015 | White | H01M 2/30 320/112 |
| 2016/0020443 A1* | 1/2016 | White | H02J 7/0024 318/245 |
| 2016/0049813 A1* | 2/2016 | Takizawa | H01M 10/441 320/112 |
| 2016/0056643 A1* | 2/2016 | Syouda | G01R 31/3679 320/134 |
| 2016/0247641 A1* | 8/2016 | Malapelle | H02M 1/32 |
| 2016/0261127 A1* | 9/2016 | Worry | H01M 10/4207 |
| 2016/0315485 A1* | 10/2016 | Magagnin | H02J 7/0024 |
| 2016/0336781 A1* | 11/2016 | Hwang | H02J 7/0021 |
| 2016/0380437 A1* | 12/2016 | Casimir | H02J 7/1415 307/9.1 |
| 2016/0380445 A1* | 12/2016 | He | H02J 7/0019 320/107 |
| 2017/0025866 A1* | 1/2017 | Goetz | H02M 1/32 |
| 2017/0052230 A1* | 2/2017 | Syouda | G01R 31/3662 |
| 2017/0063108 A1* | 3/2017 | Wang | H02J 7/0016 |
| 2017/0098940 A1* | 4/2017 | Syouda | G01R 31/36 |
| 2017/0160348 A1* | 6/2017 | Din | G01R 31/3662 |
| 2017/0214254 A1* | 7/2017 | Kubo | B60L 11/18 |
| 2017/0256984 A1* | 9/2017 | Ding | F01M 1/00 |
| 2017/0264111 A1* | 9/2017 | Komatsu | H02J 7/0014 |
| 2017/0288422 A1* | 10/2017 | Yang | H01M 10/441 |
| 2017/0288444 A1* | 10/2017 | Komulainen | H02J 50/80 |
| 2017/0310128 A1* | 10/2017 | Cheng | H02J 7/00 |
| 2017/0317374 A1* | 11/2017 | Takahashi | H01G 11/12 |
| 2018/0019601 A1* | 1/2018 | Wang | H02J 7/0019 |
| 2018/0037121 A1* | 2/2018 | Narla | H02M 3/04 |
| 2018/0056798 A1* | 3/2018 | Syouda | B60L 11/1824 |
| 2018/0062519 A1* | 3/2018 | Syouda | H02M 3/158 |

\* cited by examiner

QUICK CHARGING DEVICE WITH SWITCHING UNIT FOR INDIVIDUAL BATTERY MODULE DISCHARGING

CROSS-REFERENCE TO RELATED APPLICATION(S)

The present application claims priority to and incorporates by reference the entire contents of Japanese Patent Application No. 2016-164950 filed in Japan on Aug. 25, 2016.

BACKGROUND OF THE INVENTION

1. Field of the Invention

The present invention relates to a quick charging device.

2. Description of the Related Art

Having been conventionally available is a quick charging device for quickly charging a storage battery used onboard a vehicle, such as an electric vehicle (EV). Some quick charging devices charge storage batteries with a relatively high voltage, for example, to increase the charging speed. In such a case, the quick charging device uses a storage battery including a plurality of battery modules. When the storage battery is then to be charged, the quick charging device connects the battery modules in series. When the storage battery is to be discharged, the quick charging device connects the battery modules to a load unit at a lower voltage than that at which the storage battery is charged (see Japanese Patent Application Laid-open No. 2014-193033, for example).

There has been a demand for such a quick charging device to have a capability for quick-charging a plurality of battery modules appropriately.

SUMMARY OF THE INVENTION

The present invention is made in consideration of the above, and an object of the present invention is to provide a quick charging device capable of quick-charging a plurality of battery modules appropriately.

A quick charging device according to one aspect of the present invention includes a plurality of battery modules that store therein power; a switching unit that connects, in a charging operation, the battery modules in series and connects a charger for supplying power to the battery modules connected in series, and that selects, in a discharging operation, one of the battery modules and connects the selected battery module to a load unit; and a controller that performs an equalizing process including controlling the switching unit to equalize amounts of charge of the respective battery modules in a discharging operation.

According to another aspect of the present invention, in the quick charging device, it is preferable that when an amount of charge in the battery module connected to the load unit drops by a predetermined amount during a discharging operation, the controller performs the equalizing process by connecting the battery module with a largest amount of charge to the load unit.

According to still another aspect of the present invention, in the quick charging device, it is preferable that the battery modules include a first battery module and a second battery module, the switching unit includes a first switch that has a first contact that is connected to a negative electrode of the first battery module, a second contact that is connected to a positive electrode of the second battery module, the first switch connecting the first contact and the second contact, a second switch that has a third contact that is connected to a positive electrode of the first battery module, a fourth contact that is connected to the positive electrode of the second battery module, and a fifth contact that is connected to a negative electrode of the load unit, the second switch switching to connect the fifth contact to the third contact or to the fourth contact, and a third switch that has a sixth contact that is connected to the negative electrode of the first battery module, a seventh contact that is connected to a negative electrode of the second battery module, and an eighth contact that is connected to a positive electrode of the load unit, the third switch switching to connect the eighth contact to the sixth contact or to the seventh contact, and the switching unit forms, in a charging operation, a battery module series circuit in which the first battery module and the second battery module are connected in series by connecting the first contact of the first switch to the second contact of the first switch, so as to enable the charger to be connected to the battery module series circuit, enables, in a discharging operation, the load unit to be connected to the first battery module by connecting the fifth contact of the second switch to the third contact of the second switch, and connecting the eighth contact of the third switch to the sixth contact of the third switch, or enables, in a discharging operation, the load unit to be connected to the second battery module by connecting the fifth contact of the second switch to the fourth contact of the second switch, and connecting the eighth contact of the third switch to the seventh contact of the third switch.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
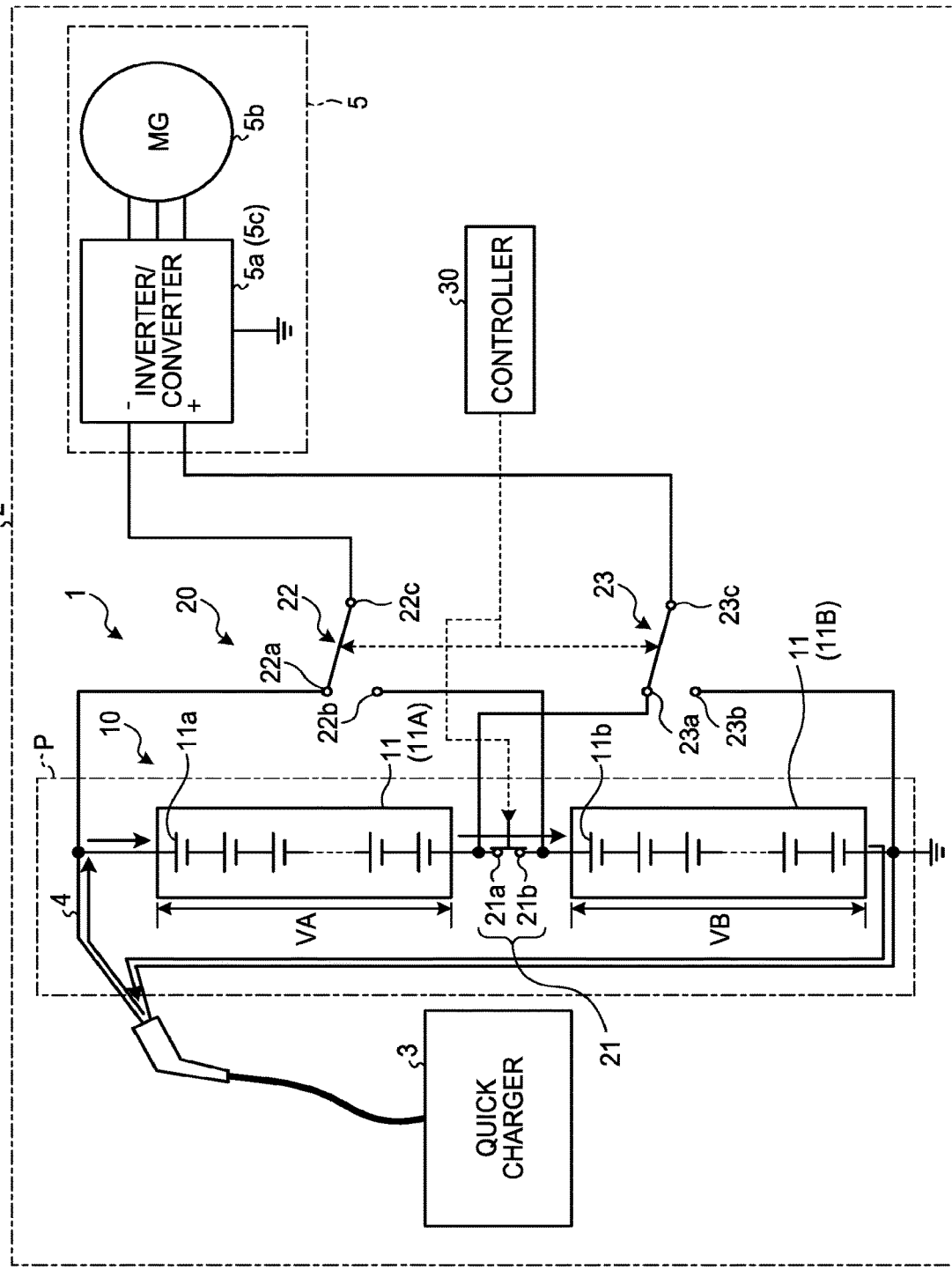
FIG. 1 is a circuit diagram illustrating an exemplary configuration of a series connection in a quick charging device according to an embodiment of the present invention.

Some embodiment for implementing the present invention will now be explained in detail with reference to some drawings. The descriptions in the following embodiments are not intended to limit the scope of the present invention in any way. Some of the elements described below include those that can be easily thought of by those skilled in the art, and those substantially the same. Furthermore, the configurations described below may be combined as appropriate. Furthermore, various types of omissions, replacement, or modifications are still possible within the scope not deviating from the spirit of the present invention.

Embodiment

A quick charging device according to an embodiment of the present invention will now be explained. The quick charging device 1 is for quickly charging a storage battery 10. Explained in this embodiment is an example in which the quick charging device 1 charges the storage battery 10 provided onboard a vehicle 2 such as an electric vehicle (EV), a plug-in hybrid electric vehicle (PHEV), or a hybrid electric vehicle (HEV). The quick charging device 1 will now be explained in detail.

The quick charging device 1 charges the power of the storage battery 10 onboard the vehicle 2, for example. The quick charging device 1 includes the storage battery 10, a switching unit 20, and a controller 30. The quick charging device 1 is connected to an external charger (quick charger) 3 over a wire harness 4, for example, and charges the storage battery 10 by receiving a power supply from the charger 3. The charger 3 is installed in a quick charging station or the like not illustrated, for example. The quick charging device 1 supplies the power charged in the storage battery 10 to an inverter 5a onboard the vehicle 2 and a motor generator 5b that are load units 5. For example, the quick charging device 1 has the storage battery 10 connected to the motor generator 5b via the inverter 5a, and the inverter 5a converts the direct current from the storage battery 10 into an alternating current, and the alternating current is supplied to the motor generator 5b.

The storage battery 10 is a battery in which the power is stored. The storage battery 10 supplies the stored power to the load unit 5. The storage battery 10 is a lithium-ion battery, for example, and includes a plurality of battery modules 11. In this example, the storage battery 10 includes two battery modules 11. Each of the battery modules 11 is referred to as a first battery module 11A or a second battery module 11B. To enable the storage battery 10 to be charged quickly, the two battery modules 11 are connected in different configurations depending on whether the storage battery 10 is to be charged or discharged. For example, to charge the storage battery 10, the first battery module 11A and the second battery module 11B are connected in series, and to discharge the storage battery 10, the first battery module 11A and the second battery module 11B are connected individually to the load unit 5. In this manner, the storage battery 10 can be charged with a voltage about twice the voltage at which the storage battery 10 is discharged, and therefore, the storage battery 10 can be quickly charged.

During charging, the positive electrode of the storage battery 10 is connected to the negative electrode of the charger 3, and the negative electrode is connected to the positive electrode of the charger 3. During discharging, the positive electrode of the storage battery 10 is connected to the negative electrode of the load unit 5, and the negative electrode is connected to the positive electrode of the load unit 5. Each of the battery modules 11 provided to the storage battery 10 includes a plurality of battery cells 11a, 11b. In this example, each of the battery cells 11a, 11b has the same voltage. Each of the battery modules 11 includes the same number of battery cells 11a, 11b. In each of the battery modules 11, several tens to several hundreds of battery cells 11a, 11b are connected in series, for example. The voltage VA of the first battery module 11A having all of the battery cells 11a fully charged is equivalent to the voltage VB of the second battery module 11B having all of the battery cells 11b fully charged.

The switching unit 20 is for switching a current path through which the current flows. The switching unit 20 switches the current path based on a switching signal issued by the controller 30 which will be described later. The switching unit 20 connects the first battery module 11A and the second battery module 11B in series, and forms a path of the current flowing from the charger 3 into the first battery modules 11A and the second battery module 11B. The switching unit 20 also connects the first battery module 11A and the second battery module 11B individually to the load unit 5, and forms a path of current flowing from one of the first battery module 11A and the second battery module 11B into the load unit 5. To begin with, the series connection of the battery modules 11 will now be explained. The switching unit 20 includes a first switch 21. The first switch 21 includes a first contact 21a that is connected to the negative electrode of the first battery module 11A, and a second contact 21b that is connected to the positive electrode of the second battery module 11B. The switching unit 20 connects the first contact 21a on the negative electrode side of the first battery module 11A to the second contact 21b on the positive electrode side of the second battery module 11B based on the switching signal. In this manner, the switching unit 20 forms a battery module series circuit P in which the battery modules 11 are connected in series, so as to enable the charger 3 to be connected to the battery module series circuit P. In such a case, the quick charging device 1 can charge the storage battery 10 at a voltage higher about twice, for example, that used in discharging the storage battery 10.

Explained now is an example in which the first battery module 11A and the second battery module 11B are individually connected to the load unit 5. The switching unit 20 includes a second switch 22 and a third switch 23. The second switch 22 has a third contact 22a that is connected to the positive electrode of the first battery module 11A, a fourth contact 22b that is connected to the positive electrode of the second battery module 11B, and a fifth contact 22c that is connected to the negative electrode of the load unit 5. The third switch 23 has a sixth contact 23a that is connected to the negative electrode of the first battery module 11A, a seventh contact 23b that is connected to the negative electrode of the second battery module 11B, and an eighth contact 23c that is connected to the positive electrode of the load unit 5.

The controller 30 is connected to the switching unit 20, and controls the switching unit 20. The controller 30 includes an electronic circuit mainly having a known microcomputer including a central processing unit (CPU), a read-only memory (ROM) and a random access memory (RAM) providing a storage unit, and an interface. The controller 30 causes the switching unit 20 to switch to the battery module series circuit P to charge, and causes the switching unit 20 to switch to a battery module individual circuit Q to discharge, by outputting a switching signal to the switching unit 20.

Figure 2:
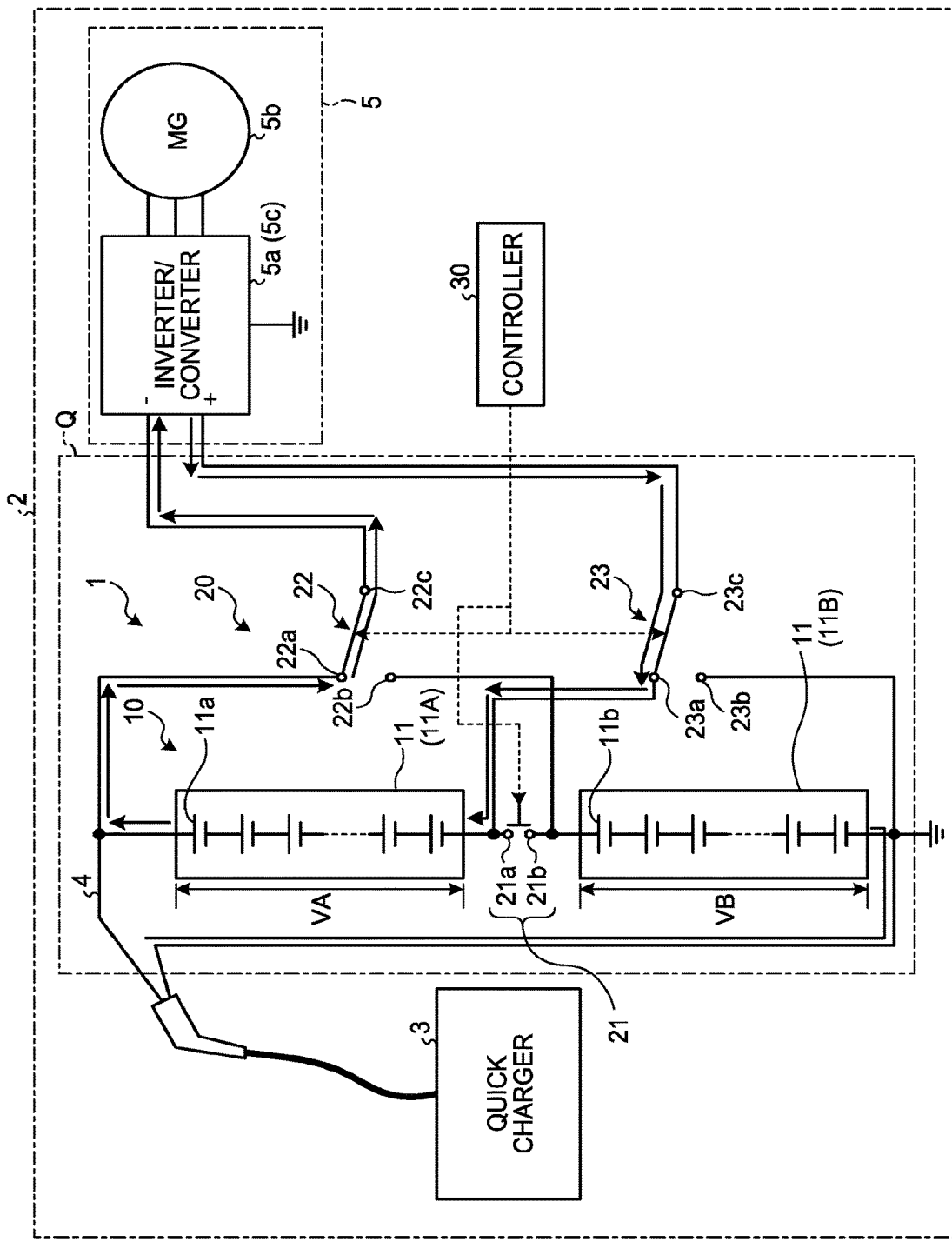
FIG. 2 is a circuit diagram illustrating an exemplary configuration of an individual connection in the quick charging device according to the embodiment.

During discharging, the switching unit 20 selects one of the battery modules 11, and connects the selected battery module 11 to the load unit 5. For example, the switching unit 20 connects the fifth contact 22c on the negative electrode side of the load unit 5 to the third contact 22a on the positive electrode side of the first battery module 11A, and connects the eighth contact 23c on the positive electrode side of the load unit 5 to the sixth contact 23a on the negative electrode side of the first battery module 11A, based on the switching signal, as illustrated in FIG. 2. In this manner, the switching unit 20 forms the battery module individual circuit Q in which the first battery module 11A is connected to the load unit 5. Therefore, the quick charging device 1 can discharge the first battery module 11A of the storage battery 10 at a voltage lower than, for example, a half or so of that used in the charging operation.

The switching unit 20 also connects the fifth contact 22c on the negative electrode side of the load unit 5 to the fourth contact 22b on the positive electrode side of the second battery module 11B, and connects the eighth contact 23c on the positive electrode side of the load unit 5 to the seventh contact 23b on the negative electrode side of the second battery module 11B, based on the switching signal. In this manner, the switching unit 20 forms the battery module individual circuit Q in which the second battery module 11B is connected to the load unit 5. Therefore, the quick charging device 1 can discharge the second battery module 11B in the storage battery 10 at a voltage lower than, for example, a half or so of that used in the charging operation.

Figure 3:
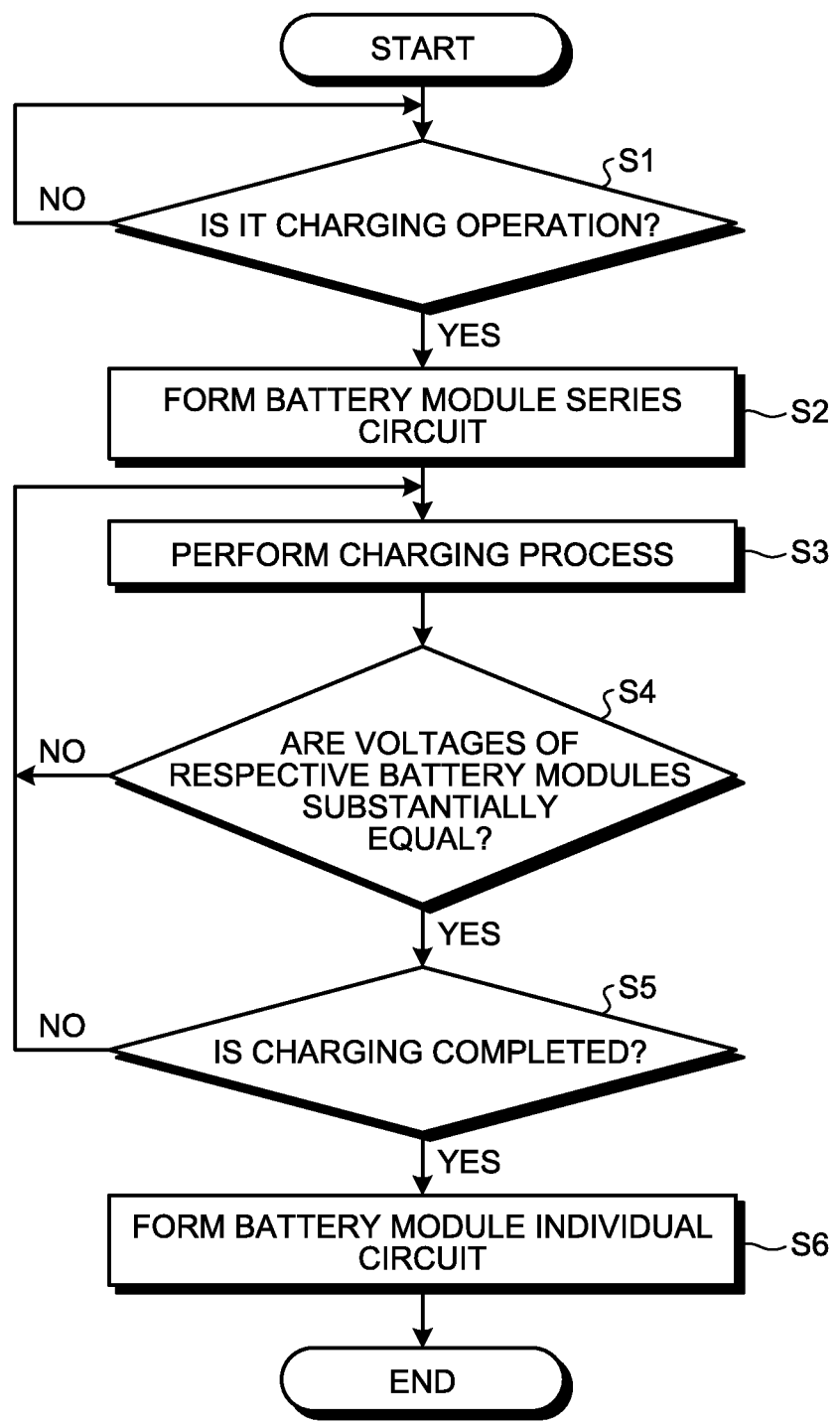
FIG. 3 is a flowchart illustrating an exemplary charging operation of the quick charging device according to the embodiment.

An exemplary charging operation of the quick charging device 1 will now be explained with reference to FIG. 3. The quick charging device 1 determines whether charging has started (Step S1). For example, the quick charging device 1 determines that charging has started if the charger 3 has been connected, and a signal for starting quick charging has been output from the charger 3. If the quick charging device 1 determines that charging has started (Yes at Step S1), the quick charging device 1 switches the switching unit 20 to form the battery module series circuit P (Step S2). The quick charging device 1 then causes the charger 3 to apply current to the battery module series circuit P, and charges each of the battery modules 11 that are connected in series (Step S3). At this time, the quick charging device 1 monitors the voltage of each of the battery cells 11a, 11b using a cell voltage sensor (CVS), and equalizes the voltages of the respective battery cells 11a, 11b by causing a battery cell 11a, 11b having reached a voltage higher than that of the other battery cells 11a, 11b to discharge into a resistance or to transfer the power to the other battery cells 11a, 11b. The charger 3 adjusts its output voltage so as to charge the storage battery 10 at a predetermined C rate (a current with respect to the battery capacity), based on the voltage of the battery module series circuit P.

The quick charging device 1 detects the voltage of the battery modules 11 using a voltage detecting unit not illustrated, and determines whether the voltages of the respective battery modules 11 are substantially equal (Step S4). If the voltages of the respective battery modules 11 are substantially equal (Yes at Step S4), the quick charging device 1 determines whether the charging has been completed (Step S5). For example, the quick charging device 1 determines whether at least one of the battery modules 11 has reached a charging ending voltage. If at least one of the battery modules 11 has reached the charging ending voltage, and the charging has been completed (Yes at Step S5), the quick charging device 1 forms the battery module individual circuit Q, and ends the process (Step S6). The charging ending voltage herein is a voltage indicating that the charging has been completed, and is a predetermined voltage for preventing overcharge.

At Step S1 described above, if the quick charging device 1 determines that the charging has not been started yet (No at Step S1), the quick charging device 1 makes a determination again. At Step S4 described above, if the voltages of the respective battery modules 11 are not substantially equal (No at Step S4), the quick charging device 1 shifts the process back to Step S3, and charges the battery modules 11 while equalizing the voltages of the respective battery cells 11a, 11b. At Step S5 described above, if none of the battery modules 11 has reached the charging ending voltage, and the charging has not been completed yet (No at Step S5), the quick charging device 1 shifts the process back to Step S3, and charges the battery modules 11 while equalizing the voltages of the respective battery cells 11a, 11b.

Figure 4:
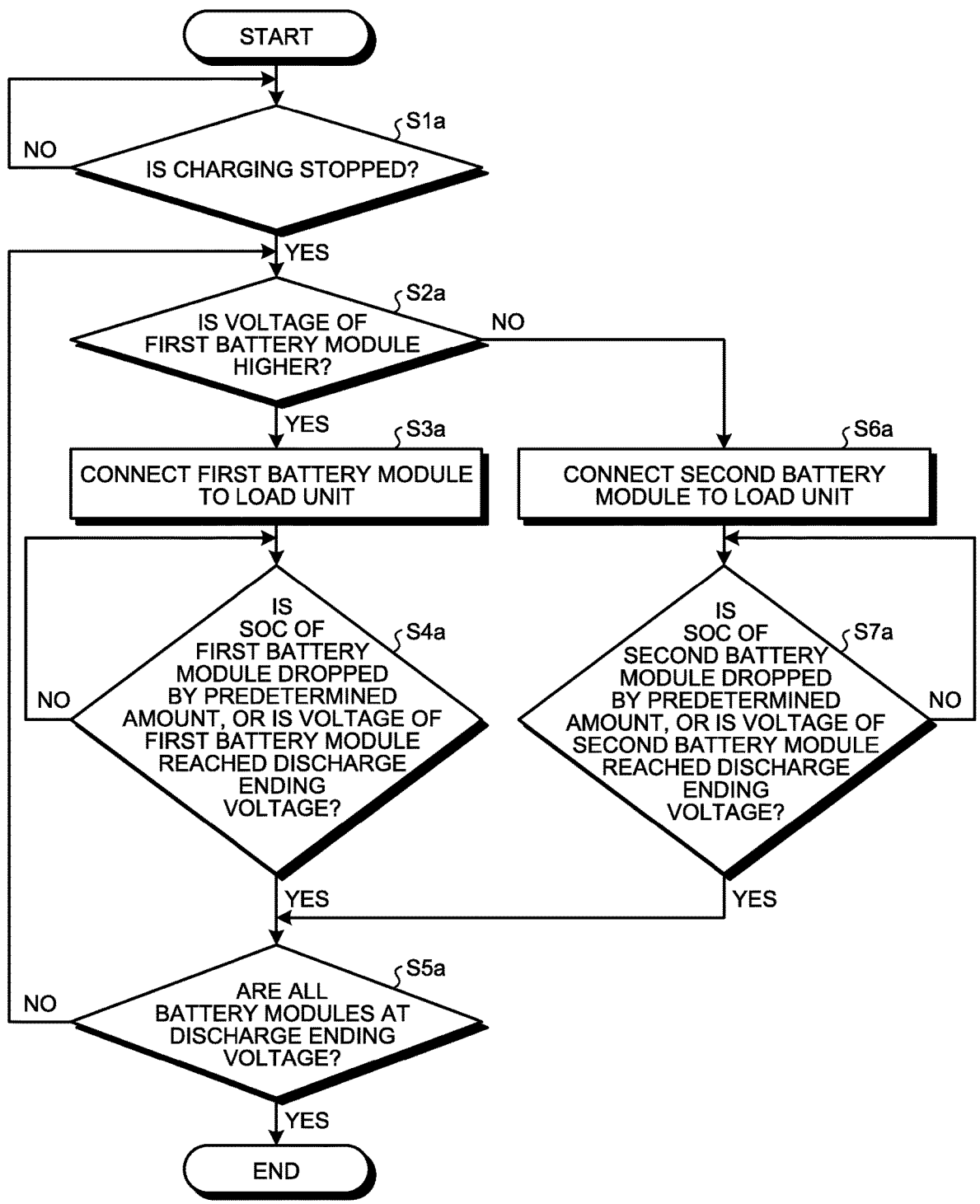
FIG. 4 is a flowchart illustrating an exemplary discharging operation in the quick charging device according to the embodiment.

An exemplary discharging operation of the quick charging device 1 will now be explained with reference to FIG. 4. The quick charging device 1 determines whether charging has been stopped (Step S1a). If the quick charging device 1 determines that charging has been stopped (Yes at Step S1a), the quick charging device 1 then determines whether the voltage VA of the first battery module 11A is higher than the voltage VB of the second battery module 11B (Step S2a). If the voltage VA of the first battery module 11A is higher than the voltage VB of the second battery module 11B (Yes at Step S2a), the quick charging device 1 connects the first battery module 11A to the load unit 5 (Step S3a). For example, the quick charging device 1 connects the fifth contact 22c on the negative electrode side of the load unit 5 to the third contact 22a on the positive electrode side of the first battery module 11A, and connects the eighth contact 23c on the positive electrode side of the load unit 5 to the sixth contact 23a on the negative electrode side of the first battery module 11A. In this manner, the quick charging device 1 connects the first battery module 11A having a larger amount of charge than that of the second battery module 11B to the load unit 5. The quick charging device 1 then determines whether the state of charge (SOC) of the first battery module 11A has dropped by a predetermined amount (for example, 5 to 10 percent or so), or whether the voltage VA of the first battery module 11A has reached a discharge ending voltage (Step S4a). The predetermined amount is a predetermined value indicating a tolerable SOC difference between the battery modules 11, for example. The discharge ending voltage is a voltage indicating to end discharging, and is a predetermined voltage for preventing overcharge. If the SOC of the first battery module 11A has dropped by the predetermined amount, or if the voltage VA of the first battery module 11A has reached the discharge ending voltage (Yes at Step S4a), the quick charging device 1 determines whether both of the battery modules 11 are at the discharge ending voltage (Step S5a). If both of the battery modules 11 are at the discharge ending voltage (Yes at Step S5a), the quick charging device 1 ends the discharging process.

At Step S1a described above, if the quick charging device 1 determines that charging has not been stopped (No at Step S1), the quick charging device 1 repeats determining until charging stops. At Step S2a described above, if the voltage VB of the second battery module 11B is higher than the voltage VA of the first battery module 11A (No at Step S2a), the quick charging device 1 connects the second battery module 11B to the load unit 5 (Step S6a). For example, the quick charging device 1 connects the fifth contact 22c on the negative electrode side of the load unit 5 to the fourth contact 22b on the positive electrode side of the second battery module 11B, and connects the eighth contact 23c on the positive electrode side of the load unit 5 to the seventh contact 23b on the negative electrode side of the second battery module 11B. In this manner, the quick charging device 1 connects the second battery module 11B having a larger amount of charge than that of the first battery module 11A to the load unit 5. The quick charging device 1 then determines whether the SOC of the second battery module 11B has dropped by a predetermined amount (5 to 10 percent or so, for example), or the voltage VB of the second battery module 11B has reached the discharge ending voltage (Step S7a). If the SOC of the second battery module 11B has dropped by the predetermined amount, or if the voltage VB of the second battery module 11B has reached the discharge ending voltage (Yes at Step S7a), the quick charging device 1 determines whether both of the battery modules 11 are at the discharge ending voltage (Step S5a). If both of the battery modules 11 are at the discharge ending voltage (Yes at Step S5a), the quick charging device 1 ends the discharging process.

At Step S4a described above, if the SOC of the first battery module 11A has not dropped by the predetermined amount, and if the voltage VA of the first battery module 11A has not reached the discharge ending voltage (No at Step S4a), the quick charging device 1 repeats the determination at Step S4a. At Step S5a described above, if both of the battery modules 11 are not at the discharge ending voltage (No at Step S5a), the quick charging device 1 shifts the process back to Step S2a, and determines whether the voltage VA of the first battery module 11A is higher than the voltage VB of the second battery module 11B. At Step S7a described above, if the SOC of the second battery module 11B has not dropped by the predetermined amount, and the voltage VB of the second battery module 11B has not reached the discharge ending voltage (No at Step S7a), the quick charging device 1 repeats the determination at Step S7a.

As described above, in the charging operation, the quick charging device 1 according to the embodiment connects the battery modules 11 in series, connects the charger 3 to the battery modules 11 that are connected in series, and in the discharging operation, selects one of the battery modules 11, and connects the selected battery module 11 to the load unit 5. In the discharging operation, the quick charging device 1 also executes an equalizing process for equalizing the amounts of charge between the battery modules 11. In this manner, the quick charging device 1 can equalize the amount of charge remaining in the battery modules 11. In other words, before quick charging is to be started, the quick charging device 1 can equalize the amounts of charge in the battery modules 11. In this manner, the quick charging device 1 can fully charge the battery modules 11, so the function of the storage battery 10 can be fully utilized. Without the equalizing process, as conventionally been so, some of the battery modules 11 provided to the storage battery 10 become fully charged before the others do, and charging of the storage battery 10 is stopped at the point in time, without allowing the other battery modules 11 to be fully charged. Because the quick charging device 1, however, executes the equalizing process, it is possible to prevent some of the battery modules 11 provided to the storage battery 10 from becoming fully charged before the others do, so that all of the battery modules 11 can be fully charged. In this manner, the quick charging device 1 can charge the battery modules 11 appropriately in quick charging. Furthermore, because the quick charging device 1 connects the battery modules 11 individually to the load unit 5, the control for making the potential difference between the battery modules 11 exactly equal can be rendered unnecessary in the charging process. Furthermore, compared with a configuration in which a parallel circuit is formed in the discharging operation, the quick charging device 1 can simplify the resistance for connecting the battery modules 11 in parallel, or balancing control for achieving a balance of discharging between the battery modules 11. Furthermore, even when one of the battery modules 11 fails, the quick charging device 1 can charge and discharge using the other battery module 11.

Furthermore, in the discharging operation, when the amount of charge in one of the battery modules 11 connected to the load unit 5 drops by the predetermined amount, the quick charging device 1 performs the equalizing process by connecting the battery module 11 with the largest amount of charge to the load unit 5. In this manner, the quick charging device 1 can equalize the amount of charge in all of the battery modules 11.

Furthermore, in a charging operation, the quick charging device 1 forms the battery module series circuit P in which the first battery module 11A and the second battery module 11B are connected in series by connecting the first contact 21a of the first switch 21 to the second contact 21b of the first switch 21, so as to enable the charger 3 to be connected to the battery module series circuit P. The quick charging device 1 also either enables, in a discharging operation, the first battery module 11A to be connected to the load unit 5 by connecting the fifth contact 22c of the second switch 22 to the third contact 22a of the second switch 22, and connecting the eighth contact 23c of the third switch 23 to the sixth contact 23a of the third switch 23, or enables, in a discharging operation, the load unit 5 to be connected to the second battery module 11B by connecting the fifth contact 22c of the second switch 22 to the fourth contact 22b of the second switch 22, and connecting the eighth contact 23c of the third switch 23 to the seventh contact 23b of the third switch 23. In this manner, the quick charging device 1 can, in a charging operation, not only connect the battery modules 11 connected in series to the charger 3, but also connect, in a discharging operation, the battery modules 11 individually to the load unit 5.

Modification of the Embodiment

The quick charging device 1 may also generate, for regenerative braking, a regenerative voltage using a motor generator 5b, boost the regenerative voltage using a converter 5c, and charge the power to the storage battery 10.

Furthermore, explained above is an example in which the storage battery 10 includes two battery modules 11, but the storage battery may also include more than two battery modules 11. Furthermore, explained above is an example in which the battery cells 11a, 11b included in the storage battery 10 have the same voltage, but may also have different voltage.

Because the quick charging device according to the embodiments performs a equalizing process for equalizing the amounts of charge in a plurality of respective battery modules when the battery modules are to be discharged, the quick charging device can charge a plurality of battery modules appropriately in quick charging operation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A quick charging device comprising:
a plurality of battery modules that store therein power, each of the plurality of battery modules being configured by connecting a plurality of battery cells in series;
a switching unit that connects, in a charging operation, the battery modules in series and connects a charger for supplying power to the battery modules connected in series, and that is configured to select, in a plurality of discharging operations including a first discharging operation and a second discharging operation, only one of the battery modules and individually connects only the selected battery module to a load unit and forms a battery module individual circuit; and a controller that performs an equalizing process including controlling the switching unit to equalize amounts of charge of the respective battery modules in the plurality of discharging operations, wherein the battery modules include a first battery module and a second battery module, the switching unit includes a first switch that has a first contact that is connected to a negative electrode of the first battery module, a second contact that is connected to a positive electrode of the second battery module, the first switch connecting the first contact and the second contact, a second switch that has a third contact that is connected to a positive electrode of the first battery module, a fourth contact that is connected to the positive electrode of the second battery module, and a fifth contact that is connected to a negative electrode of the load unit, the second switch switching to connect the fifth contact to the third contact or to the fourth contact, and a third switch that has a sixth contact that is connected to the negative electrode of the first battery module, a seventh contact that is connected to a negative electrode of the second battery module, and an eighth contact that is connected to a positive electrode of the load unit, the third switch switching to connect the eighth contact to the sixth contact or to the seventh contact, and the switching unit forms, in the charging operation, a battery module series circuit in which the first battery module and the second battery module are connected in series by connecting the first contact of the first switch to the second contact of the first switch, so as to enable the charger to be connected to the battery module series circuit, enables, in the first discharging operation, the load unit to be connected to the first battery module by connecting the fifth contact of the second switch to the third contact of the second switch, and connecting the eighth contact of the third switch to the sixth contact of the third switch, or enables, in the second discharging operation, the load unit to be connected to the second battery module by connecting the fifth contact of the second switch to the fourth contact of the second switch, and connecting the eighth contact of the third switch to the seventh contact of the third switch.

2. The quick charging device according to claim 1, wherein in each of the plurality of battery modules, several tens to several hundreds of the battery cells are connected in series.

3. The quick charging device according to claim 1, wherein the controller has a cell voltage sensor.

4. The quick charging device according to claim 1, wherein, when an amount of charge in the battery module connected to the load unit drops by a predetermined amount during the plurality of discharging operations, the controller performs the equalizing process by connecting the battery module with a largest amount of charge to the load unit.

5. The quick charging device according to claim 4, wherein the predetermined amount is between a 5 to 10 percent drop of an initial charge of the battery module, wherein the initial charge is an amount of charge before the battery module is connected to the load unit.

6. A quick charging device comprising:

a plurality of battery modules that store therein power;

a switching unit that is configured to connect, in a charging operation, all of the plurality of battery modules in series and connects a charger for supplying power simultaneously to all of the plurality of battery modules connected in series, and that selects, in a plurality of discharging operations including a first discharging operation and a second discharging operation, one of the battery modules and connects the selected battery module to a load unit; and a controller that performs an equalizing process including controlling the switching unit to equalize amounts of charge of the respective battery modules in the plurality of discharging operations, wherein the battery modules include a first battery module and a second battery module, the switching unit includes a first switch that has a first contact that is connected to a negative electrode of the first battery module, a second contact that is connected to a positive electrode of the second battery module, the first switch connecting the first contact and the second contact, a second switch that has a third contact that is connected to a positive electrode of the first battery module, a fourth contact that is connected to the positive electrode of the second battery module, and a fifth contact that is connected to a negative electrode of the load unit, the second switch switching to connect the fifth contact to the third contact or to the fourth contact, and a third switch that has a sixth contact that is connected to the negative electrode of the first battery module, a seventh contact that is connected to a negative electrode of the second battery module, and an eighth contact that is connected to a positive electrode of the load unit, the third switch switching to connect the eighth contact to the sixth contact or to the seventh contact, and the switching unit forms, in the charging operation, a battery module series circuit in which the first battery module and the second battery module are connected in series by connecting the first contact of the first switch to the second contact of the first switch, so as to enable the charger to be connected to the battery module series circuit, enables, in the first discharging operation, the load unit to be connected to the first battery module by connecting the fifth contact of the second switch to the third contact of the second switch, and connecting the eighth contact of the third switch to the sixth contact of the third switch, or enables, in the second discharging operation, the load unit to be connected to the second battery module by connecting the fifth contact of the second switch to the fourth contact of the second switch, and connecting the eighth contact of the third switch to the seventh contact of the third switch.

7. The quick charging device according to claim 6, wherein the controller has a cell voltage sensor.

8. The quick charging device according to claim 6, wherein,
when an amount of charge in the battery module connected to the load unit drops by a predetermined amount during the plurality of discharging operations, the controller performs the equalizing process by connecting the battery module with a largest amount of charge to the load unit.

9. The quick charging device according to claim 8, wherein the predetermined amount is between a 5 to 10 percent drop of an initial charge of the battery module,
wherein the initial charge is an amount of charge before the battery module is connected to the load unit.

* * * * *